United States Patent Office 3,235,359
Patented Feb. 15, 1966

3,235,359
HERBICIDAL COMPOSITION AND METHOD
Donald S. Acker, Waynesboro, Va., assignor to E. I. du Pont de Nemours and Company, Wilmington, Del., a corporation of Delaware
No Drawing. Original application Aug. 17, 1960, Ser. No. 50,072. Divided and this application Sept. 25, 1962, Ser. No. 226,164
2 Claims. (Cl. 71—2.5)

This application is a divisional application of copending application Serial No. 50,072, filed August 17, 1960, which in turn is a continuation-in-part of the copending application Serial No. 646,541, filed March 18, 1957, both now abandoned.

This invention relates to 2-chloro-4,6-bis-(alkoxypropyl-amino)-s-triazines and to herbicidal compositions and methods employing these compounds.

I have found that the substituted symmetrical triazines represented by the following formula possess outstanding herbicidal activity:

(1)
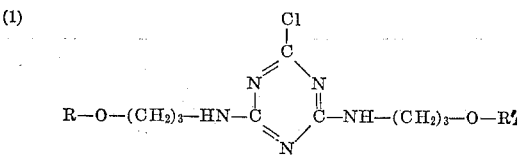

where R and R' can be the same or different and are alkyl groups of less than 4 carbon atoms, namely methyl, ethyl, propyl or isopropyl.

These novel substituted triazines where R and R' are the same can be prepared by the reaction of cyanuric chloride with two molecular equivalents of an appropriate amine, in accordance with the following illustrative equation:

(2)
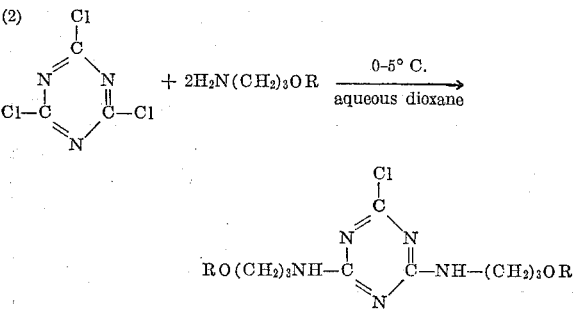

The substituted triazines according to this invention where R and R' are different can be prepared by the reaction of cyanuric chloride with one molecular equivalent of an amine of the formula $H_2N—(CH_2)_3—OR$, in accordance with the following equation:

(3)
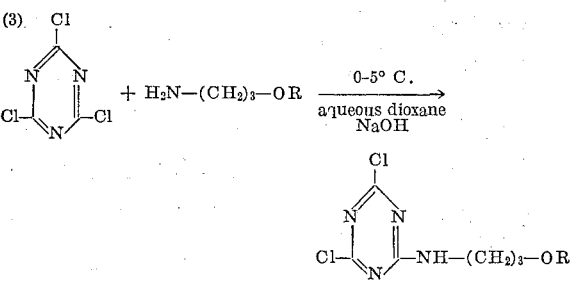

followed by reaction with one molecular equivalent of an amine of the formula $H_2N—(CH_2)_3—OR'$, as follows:

(4)
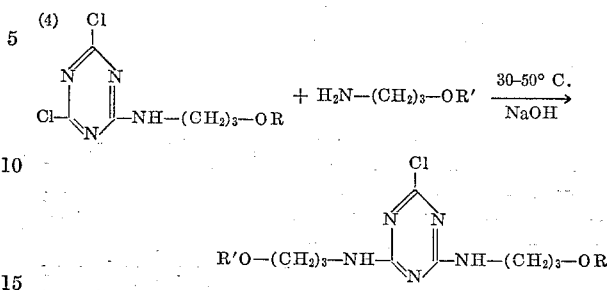

According to an alternative method of preparing the unsymmetrical triazines of this invention, cyanuric chloride is reacted with a mixture of equimolecular amounts of the two amines $H_2N—(CH_2)_3—OR$ and

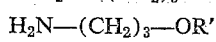
$H_2N—(CH_2)_3—OR'$ according to Reaction Equation 2 above.

The product of this reaction is isolated by neutralization with aqueous alkali followed by cooling of the reaction mixture, bringing about precipitation of the product which can then be recovered by simple filtration. If desired, the product can be recrystallized from common organic solvents, preferably polar solvents such as dioxane, dimethylformamide, water, dimethylsulfoxide, and acetone or combinations thereof, giving a high purity product.

These compounds are in most instances crystalline solids that are relatively insoluble in water. As aforementioned, the compounds of Formula 1 are characterized by outstanding herbicidal activity. When applied at appropriate dosages, they are effective in controlling both broadleaf weeds and grasses. They can be used as soil sterilants and also as post- and pre-emergence herbicides.

In use these compounds can be applied to areas to be protected from undesirable vegetation in any of a variety of compositions. Thus any that are sufficiently water-soluble can be applied simply as water solutions.

It is preferred, however, that the compounds be extended with a carrier material or conditioning agent of the kind used and commonly referred to in the art as a herbicidal adjuvant or modifier. Such adjuvants are inert solids, surface active agents and organic liquids.

The compounds shown above will be included in such compositions in sufficient amount so that they can exert a herbicidal effect. Usually from about 1 to 95% by weight of the compounds are included in such formulations.

Powder formulations can be prepared with inert solids. The formulations thus can be prepared with inert solids to form dusts, or suspended in a suitable liquid medium for spray application. The powders usually comprise active ingredient admixed with minor amounts of conditioning agent. Natural clays (either absorptive such as attapulgite or relatively non-absorptive such as china clays), diatomaceous earth, walnut shell flour, redwood flour, synthetic fine silica, calcium silicate and other inert solid carriers of the kind conventionally employed in powder fungicidal compositions can be used. The active ingredient usually makes up from about 25–90% of these powder compositions. The solids ordinarily should be very finely divided and should have a particle size below about 50 microns and preferably below about 20 microns. For conversion of the powders to dusts, talc, pyrophyllite, tobacco dust, volcanic ash and other dense, rapid-settling inert solids customarily are used.

If the active compound is water soluble, it can be sprayed or in any other desired manner applied to an absorptive powder which can then be dried to produce a dry product. Any of the above absorptive materials can be used for the preparation of such products.

Liquid compositions including the active compounds above described can be prepared by admixing the compound with a suitable liquid diluent medium. The active compound can be either in solution or in suspension in the liquid medium. Typical of the liquid media commonly employed are kerosene, Stoddard solvent, xylene, alcohols, alkylated naphthalene, diesel oil, glycols and ketones such as diisobutyl ketone, cyclohexanone, etc. The active ingredient usually makes up from about 0.5 to 50% of these liquid compositions. Some of these compositions are designed to be used as such, and others to be extended with large quantities of water.

Compositions in the form of wettable powders or liquids can also include one or more surface-active agents such as wetting, dispersing or emulsifying agents. Thus mixtures of the above liquids with the active compounds can contain an emulsifying agent to make an emulsifiable oil composition. The surface-active agents cause the compositions to disperse or emulsify easily in water to give aqueous sprays.

The surface-active agents employed can be of the anionic, cationic or nonionic type. They include, for example, sodium oleate, sulfonated petroleum oils, alkyl aryl sulfonates, sodium lauryl sulfate, polyethylene oxides, lignin sulfonates, and other surface active agents. A detailed list of such agents is set forth in an article by McCutcheon in "Soap and Chemical Specialties," volume 31, No. 7, pages 50–61; No. 8, pages 48–61; No. 9, pages 52–67; and No. 10, pages 48–67 (1955).

The compounds can be applied in compositions of the types shown in Jones U.S. Patent 2,412,510 in which an active compound of the invention replaces the active materials of that patent in the composition shown and in like amounts. Similarly, any of the carriers, additives or surface-active agents there named or referred to can be used.

The herbicidal method of the present invention comprises applying a substituted triazine of Formula 1, ordinarily in a herbicidal composition of the aforementioned type, to the locus or area to be protected from undesirable plant growth. The active compound is, of course, applied in sufficient amount to exert the desired herbicidal action. The aplication can be made directly upon the locus or area and the vegetation thereon during the period of infestation. Alternatively, the application can be made in advance of an anticipated weed infestation.

The dosage employed can be determined readily by those skilled in the art by conventional techniques. It is, of course, dependent upon the particular active ingredient employed, the nature of the formulation used, the type of treatment, the type of vegetation to be controlled, climatic conditions and the like. In general, complete control of vegetation is obtained at rates of about 10 to 30 pounds per acre of the active ingredient. Application at rates of about 0.5 to 5 pounds per acre of the active ingredient for pre-emergence or early directed post-emergence treatment gives excellent control of broadleaf weeds and grasses such as mustard, pigweed, lambsquarters, chickweed, velvetleaf, crabgrass, millet, ryegrass, foxtail, barnyard grass and cheat, in crop plants such as corn, cotton and sorghum. When applied to established perennial grasses at rates of about 0.5 to 2.0 pounds per acre, good control of germinating broadleaf weeds and crabgrass is obtained with minimum injury to the mature grasses.

In order that the invention can be better understood, the following examples are given in addition to those set forth above:

EXAMPLE 1

A freshly prepared slurry of 0.1 mole of cyanuric chloride in aqueous dioxane is stirred at 0° to 5° C. while 0.2 mole of 3-methoxypropylamine is added. The mixture is allowed to warm to room temperature and then treated with a solution of 8 grams of sodium hydroxide in 25 ml. of water at such a rate that the solution remains neutral or slightly alkaline to phenolphthalein. The temperature is allowed to rise to 40–45° C. The reaction mixture is cooled in ice, and the precipitate is collected and dried in vacuo at 100° C. Recrystallization from dioxane gives 23.5 grams (81%) of 2-chloro-4,6-bis(3-methoxypropylamino)-s-triazine having a melting point of 159–163° C.

EXAMPLES 2–4

The products listed in the following table are prepared in accordance with the procedure of Example 1 by replacing the amine of Example 1 with the amine listed in the table.

Table 1

| Example No. | Amine | Weight Used (0.2 mole), grams | Product Obtained |
|---|---|---|---|
| 2 | Ethoxypropylamine | 20.6 | 2-chloro-4,6-bis-(ethoxypropylamino)-s-triazine. |
| 3 | Propoxypropylamine | 23.4 | 2-chloro-4,6-bis-(propoxypropylamino)-s-triazine. |
| 4 | Isopropoxypropylamine. | 23.4 | 2-chloro-4,6-bis-(isopropoxypropylamino)-s-triazine. |

EXAMPLE 5

A freshly prepared slurry of 0.1 mole of cyanuric chloride in aqueous dioxane is stirred at 0° to 5° C. while 0.1 mole of 3-methoxypropylamine is added. Then, a solution of 4 grams of sodium hydroxide in 15 milliliters of water is added at 0°–5° C., while stirring, at such a rate that the solution remains neutral or slightly alkaline to phenolphthalein.

After the addition is complete, 0.1 mole of 3-propoxypropylamine is added, and the temperature allowed to rise to between 30° and 50° C., say 40° C., where a reasonable reaction rate can be maintained. A solution of 4 grams of sodium hydroxide in 15 milliliters of water is added, with slurry, at such a rate that the solution remains neutral or slightly alkaline to phenolphthalein. The reaction mixture is cooled in ice, and the precipitate is collected and dried in vacuo at 100° C. Recrystallization from dioxane gives essentially pure 2-chloro-4-methoxypropylamino-6-propoxypropylamine-s-triazine.

The following compounds are also prepared in accordance with the procedure of Example 5 by utilizing cyanuric chloride and the appropriate amines:

Example No.:
  (6) 2 - chloro-4-methoxypropylamino-6-ethoxypropylamino-s-triazine
  (7) 2 - chloro-4-methoxypropylamino-6-propoxypropylamino-s-triazine
  (8) 2 - chloro-4-methoxypropylamino-6-isopropoxypropylamino-s-triazine
  (9) 2 - chloro-4-ethoxypropylamino-6-propoxypropylamino-s-triazine
  (10) 2 - chloro-4-ethoxypropylamino-6-isopropoxypropylamino-s-triazine
  (11) 2-chloro-4-propoxypropylamino - 6 - isopropoxypropylamino-s-triazine

EXAMPLE 12

The following wettable powder compositions are prepared by blending the listed ingredients together in a ribbon blender, and then micropulverizing until substantially all of the particles are below 50 microns in diameter followed by a reblending step.

(A)

| | Percent |
|---|---|
| 2-chloro-4,6-bis(methoxypropylamino)-s-triazine | 75 |
| Sodium alkyl naphthalene sulfonate | 1.5 |
| Low viscosity methyl cellulose | 0.25 |
| Synthetic fine silica | 23.25 |

This composition, when applied at the rate of 30 pounds per acre of active ingredient in 300 gallons of water, gives excellent control of grass and broadleaf weeds, including crabgrass, goose grass, barnyard grass, yellow foxtail, pigweed, mustard, lambsquarters and ragweed. Good weed control is obtained for an extended period of time.

Another portion of this formulation is applied at a rate of 25 pounds per acre of active ingredient extended with 200 gallons of water to an area heavily infested with quackgrass and Johnson grass. Excellent kill of the foliage is noted within 14 days after treatment.

Another portion of this composition is extended with water to give a 1% sprayable formulation of active ingredient. This is sprayed onto foliage of mature cotton until the foliage is wetted thoroughly. Excellent defoliation of the cotton is obtained.

At the rate of 2 pounds of triazine per acre in 40 gallons of water, this composition gives good pre-emergence control of broadleaf weeds such as mustard, pigweed and chickweed, and grass weeds such as crabgrass, foxtail and Johnson grass, in newly seeded fields of corn and peanuts, with no injury to the crops.

(B)

| | Percent |
|---|---|
| 2-chloro-4,6-bis(ethoxypropylamino)-s-triazine | 50 |
| Sodium lauryl sulfate | 0.5 |
| Sodium lignin sulfonate | 1.0 |
| Attapulgite clay | 48.5 |

60 pounds of this formulation is extended with 200 gallons of water and applied at the rate of 30 pounds per acre of active ingredient onto a weed infested area. Excellent weed control is obtained.

(C)

| | Percent |
|---|---|
| 2-chloro-4,6-bis(propoxypropylamino)-s-triazine | 75 |
| Polyoxyethylene esters of mixed fatty acids concreted with urea | 2 |
| Synthetic calcium silicate | 23 |

This composition can be dispersed in either water or oil for application. When applied as a pre-emergence treatment in 80 gallons of water per acre at the rate of 4 pounds of the active ingredient per acre, excellent control of annual broadleaf and grass weeds in corn and cotton is obtained. When applied at the rate of 20 pounds of the active ingredient per acre in 100 gallons of diesel oil, excellent control of broadleaf and grass weeds is obtained.

(D)

| | Percent |
|---|---|
| 2-chloro-4,6-bis(ethoxypropylamino)-s-triazine | 50 |
| Oleyl ester of sodium isethionate | 1.0 |
| Partially desulfonated sodium lignin sulfonate | 0.5 |
| Diatomaceous silica | 48.5 |

When applied at the rate of 30 pounds of active ingredient per acre in 200 gallons of water to an area infested with both grasses and broadleaf weeds, excellent weed control is obtained.

EXAMPLE 13

The following dust compositions are prepared by first blending together the active material and the minor diluent and then micropulverizing. The resulting powder concentrate is then extended with the major diluent in a second blending operation.

(A)

| | Percent |
|---|---|
| 2-chloro-4,6-bis(propoxypropylamino)-s-triazine | 10 |
| Attapulgite clay | 10 |
| Micaceous talc | 80 |

(B)

| | Percent |
|---|---|
| 2-chloro-4,6-bis(ethoxypropylamino)-s-triazine | 20 |
| Diatomaceous silica | 30 |
| Pyrophyllite | 50 |

(C)

| | Percent |
|---|---|
| 2-chloro-4,6-bis(methoxypropylamino)-s-triazine | 15 |
| Kaolin clay | 15 |
| Tobacco dust | 70 |

(D)

| | Percent |
|---|---|
| 2-chloro-4,6-bis(isopropoxypropylamino)-s-triazine | 10 |
| Synthetic calcium silicate | 10 |
| Pulverized phosphate rock | 80 |

These compositions are applied with hand-dusting equipment at the rate of 25 to 30 pounds of the active ingredient per acre to weed-infested areas using standard dusting equipment. Good control of crabgrass, pepper grass, ragweed, lambsquarters and other weeds is thereby obtained.

This example is repeated, substituting the compounds of Examples 6 through 11 for the triazines of this example, with equally excellent results noted.

EXAMPLE 14

The following pellet compositions are prepared by first blending and micropulverizing the components, then moistening with 10–20% water followed by extrusion through orifices to produce compacted pellets.

(A)

| | Percent |
|---|---|
| 2-chloro-4,6-bis(methoxypropylamino)-s-triazine | 5 |
| Alkyl naphthalene sulfonate, Na salt | 1 |
| Anhydrous sodium sulfate | 10 |
| Hydrated non-swelling clay | 84 |

(B)

| | Percent |
|---|---|
| 2-chloro-4,6-bis(ethoxypropylamino)-s-triazine | 25 |
| Sodium lignin sulfonate | 10 |
| Kaolin clay | 65 |

(C)

| | Percent |
|---|---|
| 2-chloro-4,6-bis(propoxypropylamino)-s-triazine | 15 |
| Bentonite clay (montmorillonite) | 85 |

These formulations, when applied at the rate of 25 to 30 pounds of the active ingredient per acre to undesirable vegetation including both broadleaf and grass weeds, give excellent weed control.

EXAMPLE 15

The following powders are prepared in accordance with the procedure of Example 12. They are intended primarily for dispersion in an oil medium for application from an oil suspension. However, they are also dispersible in water and can be used in accordance with the procedure of Example 12.

(A)

| | Percent |
|---|---|
| 2-chloro-4,6-bis(methoxypropylamino)-s-triazine | 50 |
| Polyoxyethylene esters of mixed fatty and resin acids blended with oil soluble petroleum sulfonates | 5 |
| Attapulgite clay | 45 |

(B)

| | |
|---|---|
| 2-chloro-4,6-bis(ethoxypropylamino)-s-triazine | 75 |
| Oil soluble petroleum sulfonate | 5 |
| Diatomaceous silica | 20 |

These compositions, when applied at the rate of 25 pounds per acre of active ingredient after extension with diesel oil to make a total application of 80 gallons of solution per acre, give excellent post-emergence control of heavy infestations of grass and broadleaf weeds, such as quackgrass, foxtail, crabgrass, black-eyed-susan, pigweed, and flower-of-an-hour.

I claim:

1. The method for the control of weeds comprising applying to the locus to be treated, in a herbicidally effective amount, a compound represented by the formula

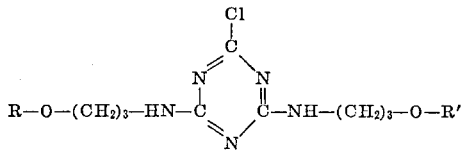

where R and R' are alkyl of less than 4 carbon atoms.

2. A herbicidal composition comprising a surface active agent selected from the group consisting of anionic, cationic and nonionic surface active agents, and a herbicidal amount of a compound represented by the formula

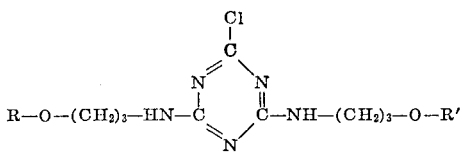

where R and R' are alkyl of less than 4 carbon atoms.

References Cited by the Examiner
UNITED STATES PATENTS

| | | | |
|---|---|---|---|
| 2,497,917 | 2/1950 | Stauffer | 260—249.8 X |
| 2,891,855 | 6/1959 | Gysin et al. | 71—2.5 |
| 3,152,882 | 10/1964 | Luckenbough | 71—2.6 X |

LEWIS GOTTS, *Primary Examiner.*

JULIAN S. LEVITT, *Examiner.*